US007457255B2

(12) United States Patent
Cheshire

(10) Patent No.: US 7,457,255 B2
(45) Date of Patent: Nov. 25, 2008

(54) METHOD AND APPARATUS FOR PROVIDING LINK-LOCAL IPV4 ADDRESSING ACROSS MULTIPLE INTERFACES OF A NETWORK NODE

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 912 days.

(21) Appl. No.: 10/877,533

(22) Filed: Jun. 25, 2004

(65) Prior Publication Data

US 2005/0286515 A1    Dec. 29, 2005

(51) Int. Cl.
*H04L 12/28* (2006.01)
*H04Q 7/24* (2006.01)
*G06F 15/177* (2006.01)
*G06F 3/00* (2006.01)

(52) U.S. Cl. .................. 370/256; 370/338; 370/409; 709/220; 710/3; 710/9; 710/10

(58) Field of Classification Search ................. 370/256, 370/409, 338, 389; 709/220; 710/10, 9, 710/3
See application file for complete search history.

(56) References Cited

U.S. PATENT DOCUMENTS

| 6,334,153 | B2 * | 12/2001 | Boucher et al. ............. 709/230 |
| 2003/0026230 | A1 * | 2/2003 | Ibanez et al. ................ 370/338 |
| 2003/0181203 | A1 * | 9/2003 | Cheshire ..................... 455/419 |
| 2004/0109460 | A1 * | 6/2004 | Banks et al. ................ 370/401 |
| 2004/0213234 | A1 * | 10/2004 | Koch et al. .................. 370/392 |
| 2004/0258074 | A1 * | 12/2004 | Williams et al. ......... 370/395.5 |

OTHER PUBLICATIONS

Stuart Cheshire, "Dynamic Configuration of Link-Local IPv4 Addresses," Jun 3, 2003, Zeroconf Working Group, Draft 8, p. 3-16,27.*
Yong-Geun Hong et al., "Autoconfiguration of IPv4 Link-Local Addresses in Multilink Networks <draft-hong-zeroconf-multilink-ipv4-00.txt>", Internet Draft, Nov. 2001, pp. 1-6, XP002345010, http://www.watersprings.org./pub/id/draft-hong-zeroconf-multilink-ipv4-00.txt.

* cited by examiner

*Primary Examiner*—Hassan Kizou
*Assistant Examiner*—Ryan C Kavleski
(74) *Attorney, Agent, or Firm*—Park, Vaughan & Fleming LLP

(57) ABSTRACT

A system to provide link-local IPv4 addressing across multiple interfaces of a network-node. The network-node broadcasts an Address Resolution Protocol (ARP) request packet on multiple interfaces which asks for the hardware address of a network node whose link-local IPv4 address is Y. In response, the network-node receives an ARP-reply packet on an interface from a target network-node. If Y is present in the ARP cache and is associated with a different interface, the source network-node chooses a winner interface, and updates the ARP cache so that Y is associated with the winner interface. The network-node sends one or more contention-resolution packets on the loser interface to cause a loser network-node to choose another link-local IPv4 address for itself.

19 Claims, 3 Drawing Sheets

METHOD AND APPARATUS FOR PROVIDING LINK-LOCAL IPV4 ADDRESSING ACROSS MULTIPLE INTERFACES OF A NETWORK NODE

BACKGROUND

1. Field of the Invention

The present invention relates to the process of configuring Internet Protocol version 4 (IPv4) addresses on a network node. More specifically, the Present invention relates to a method and an apparatus for providing link-local IPv4 addressing across multiple interfaces of a network node.

2. Related Art

The ever-increasing popularity of mobile computing and the proliferation of intelligent devices are necessitating network nodes, such as computers and printers, to support a plethora of interfaces. Moreover, network nodes are being enabled to support Internet Protocol version 4 (IPv4) over these various interfaces. For example, computers have recently started supporting IPv4-over-Universal Serial Bus (USB) and IPv4-over-Firewire. These and other developments have created a strong demand for mechanisms to facilitate automatic configuration of network nodes in an IPv4 network, thereby drastically simplifying the process of configuring network nodes.

In order to participate in an IPv4 network, a network node, such as a computer or a printer, needs to be configured with IPv4 addresses for one or more of its interfaces. Additionally, in order to enable communication, the network node needs the ability to translate an IPv4 address into the corresponding hardware address. The Address Resolution Protocol (ARP) is a link-level protocol that solves the translation problem by providing an address-resolution mechanism that can be used to find the hardware address for a given IPv4 address, thereby enabling a network node to participate in an IPv4 network.

IPv4 addresses can be configured either manually by the user, or automatically by the help of another network node, such as a DHCP server. Unfortunately, a DHCP server may not always be available. Moreover, it is cumbersome to have the user configure an IPv4 address. Therefore, there is a strong need for a mechanism by which a network node can automatically configure an IPv4 address on its own.

Link-local IPv4 addressing provides such a mechanism. In link-local IPv4 addressing, a network node picks a random IPv4 address in a specified link-local address range and checks for its uniqueness within the scope of the link. If the address is already in use by another network node, then it picks another address and tries again. Once it finds a unique link-local IPv4 address, it uses it to communicate with other nodes in the network.

Unfortunately, since link-local addresses are only guaranteed to be unique within the scope of a link, a source network-node typically configures only one interface out of all of its interfaces for link-local addressing, because otherwise, two target network-nodes that are connected on different interfaces of the source network-node may choose the same IPv4 address, thereby creating an address ambiguity. This is a severe limitation in today's networks, because while the number of interfaces in a network node continues to increase, the user is being forced to use link-local addressing on only one of the interfaces, thereby preventing the user from leveraging link-local IPv4 addressing to simplify network-node configuration.

Hence, what is needed is a method and an apparatus that can provide link-local IPv4 addressing across multiple interfaces of a network node.

SUMMARY

One embodiment of the present invention provides a system for providing link-local IPv4 addressing across multiple interfaces of a source network-node. During system operation, the source network-node broadcasts an Address Resolution Protocol (ARP) request packet on multiple interfaces, wherein the ARP-request packet asks for the hardware address of a network node whose link-local IPv4 address is Y. Next, the source network-node receives an ARP-reply packet on interface $Z_1$ from a target network-node whose link-local IPv4 address is Y and whose hardware address is X. If Y is not present in the ARP cache of the source network-node, an entry is added to the ARP cache, which specifies that IP address Y is at the hardware address X on interface $Z_1$. Alternatively, if Y is already present in the ARP cache of the source network-node and is associated with a different interface $Z_2$, the source network-node chooses a winner interface out of $Z_1$ and $Z_2$. If interface $Z_1$ is chosen as the winner, the source network-node updates the ARP cache so that it specifies that IP address Y is at the hardware address X on interface $Z_1$. Finally, the source network-node sends one or more contention-resolution packets on the loser interface to cause the loser network-node to choose another link-local IPv4 address for itself.

In a variation on this embodiment, the interface can be an Ethernet interface, a USB interface, a Firewire interface, or an AirPort interface.

In a variation on this embodiment, the address prefix for link-local IPv4 addresses can be 169.254/16.

In a variation on this embodiment, the contention-resolution packets can be ARP packets.

In a variation on this embodiment, the winner interface is chosen based on the speed of the interface.

In a variation on this embodiment, sending one or more contention-resolution packets on the loser interface involves sending the packets directly to the loser network-node.

In a variation on this embodiment, sending one or more contention-resolution packets on the loser interface involves broadcasting the packets on the loser interface.

In a variation on this embodiment, the winner network-node and the loser network-node can be the same entity.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Network Node

Figure 1:
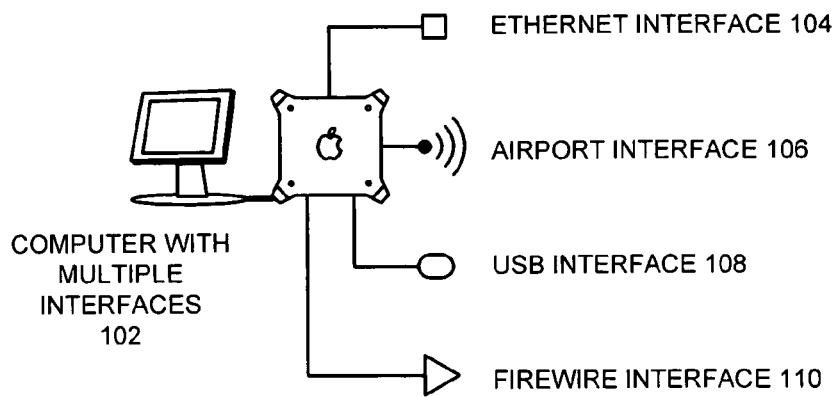
FIG. 1 illustrates a network node, such as a computer, with multiple interfaces, in accordance with an embodiment of the present invention.

FIG. 1 illustrates a network node, such as a computer 102, with multiple interfaces 104, 106, 108, and 110, in accordance with an embodiment of the present invention. A network node can generally include any type of communication device capable of communicating with other network nodes via a communication network. This includes, but is not limited to, a computer system based on a microprocessor, a mainframe computer, a printer, a video camera, an external disk drive, a router, a switch, a personal organizer, and a mobile phone.

The computer 102 illustrated in FIG. 1 has four interfaces, namely, Ethernet interface 104, Airport interface 106, USB interface 108, and Firewire interface 110. An interface can generally include any type of communication component that enables a network node to communicate with another network node over a wire or wireless communication channel. Any of the four interfaces 104, 106, 108, and 110, can enable the computer 102 to participate in an IPv4 network. For example, the computer 102 can use its Ethernet interface 104 to participate in an IPv4-over-Ethernet local-area network.

Network

Figure 2:
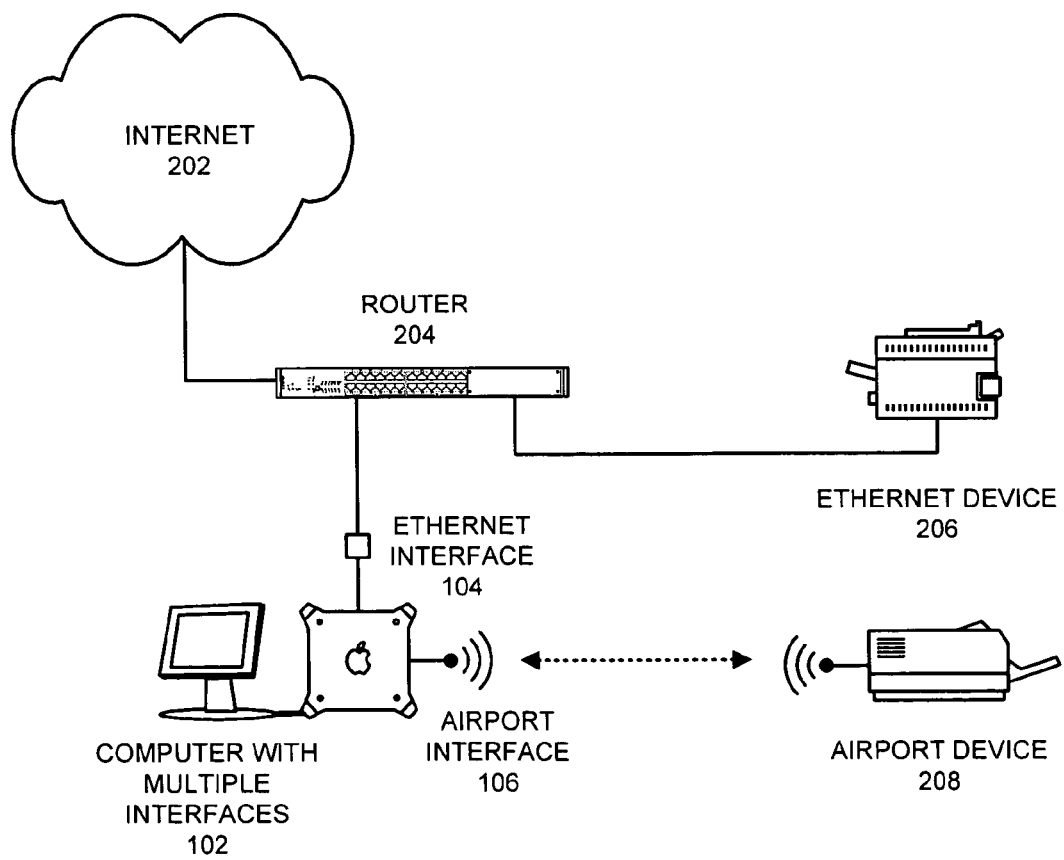
FIG. 2 illustrates how a network node, such as a computer, can use two of its interfaces to communicate with other network nodes, in accordance with an embodiment of the present invention.

FIG. 2 illustrates how a network node, such as a computer 102, can use two of its interfaces, Ethernet interface 104 and AirPort interface 106, to communicate with other network nodes, in accordance with an embodiment of the present invention. The Ethernet interface 104 is connected to a router 204, which enables the computer 102 to communicate with the Ethernet device 206. Similarly, the AirPort interface 106 enables the computer 102 to communicate with an AirPort device 208. In FIG. 2, although we omitted the USB interface 108 and the Firewire interface 110, which were illustrated in FIG. 1, it will be readily apparent to one skilled in the art that they could also be used for communicating with other network nodes.

It is evident from FIG. 2 that a computer 102 can be connected to multiple network nodes via its interfaces 104 and 106. There is consequently a strong need to provide link-local IPv4 addressing across multiple interfaces 104 and 106 of the computer 102 to allow the interfaces 104 and 106 to be automatically configured by the computer 102.

Structure of an ARP Packet

Figure 3:
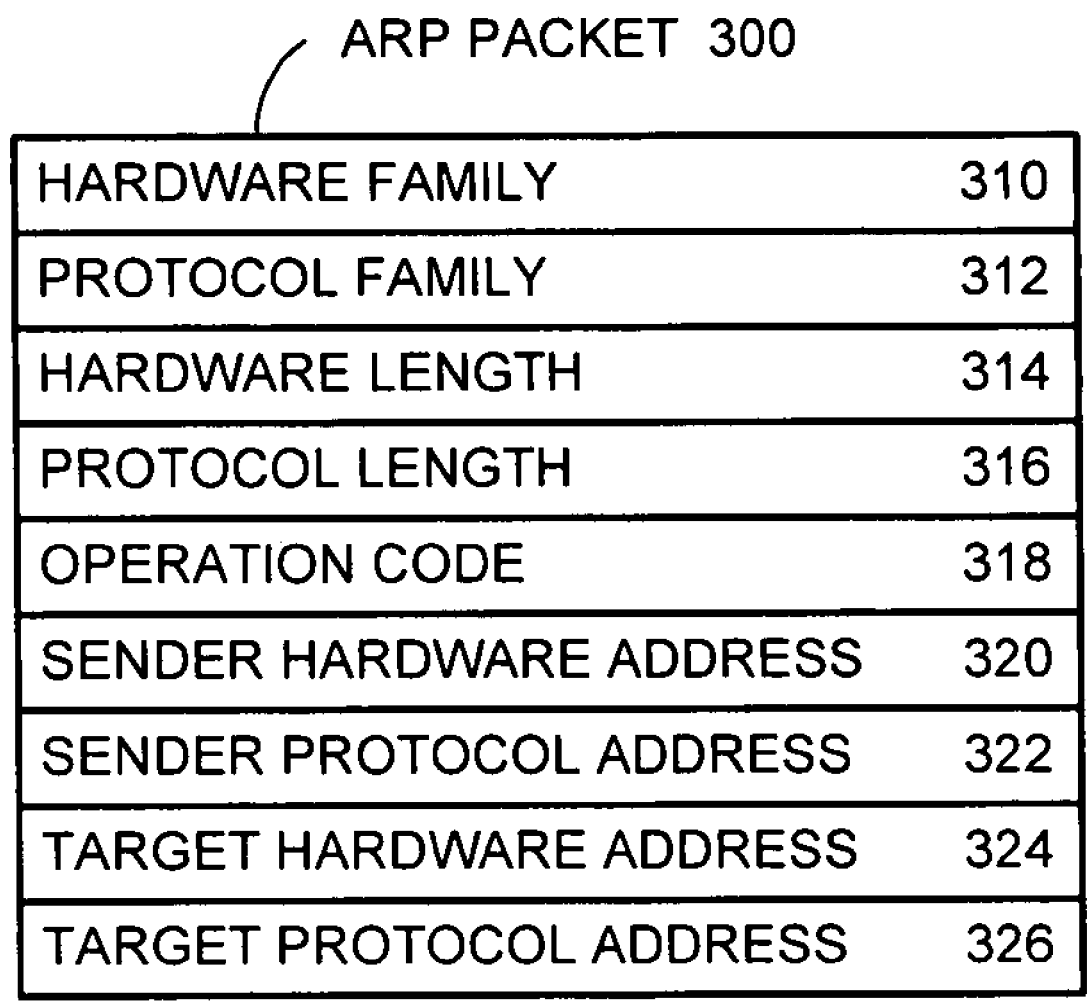
FIG. 3 illustrates an ARP packet that contains a number of pieces of information that can be used by a source network-node, such as a computer, to resolve the IPv4 address of a target network-node, such as an AirPort device, in accordance with an embodiment of the present invention.

FIG. 3 illustrates an ARP packet 300 that contains a number of pieces of information that can be used by a source network-node, such as a computer 102, to resolve the IPv4 address of a target network-node, such as an AirPort device 208, in accordance with an embodiment of the present invention.

Specifically, ARP packet 300 contains a hardware family field 310 and the protocol family field 312 that specify the type of hardware and the type of protocol, respectively. ARP packet 300 also includes a hardware length field 314 and a protocol length field 316 that specify the sizes (in bytes) of the hardware addresses and the protocol addresses, respectively. Additionally, ARP packet 300 contains an operation code 318, which specifies whether the packet is an ARP-request packet or an ARP-reply packet. Furthermore, ARP packet 300 also contains four addresses, namely, the sender hardware address 320, the sender protocol address 322, the target hardware address 324, and the target protocol address 326, which are used for translating the IPv4 address of a target network-node into the corresponding hardware address.

Process of Providing Link-Local IPv4 Addressing Across Multiple Interfaces

Figure 4:
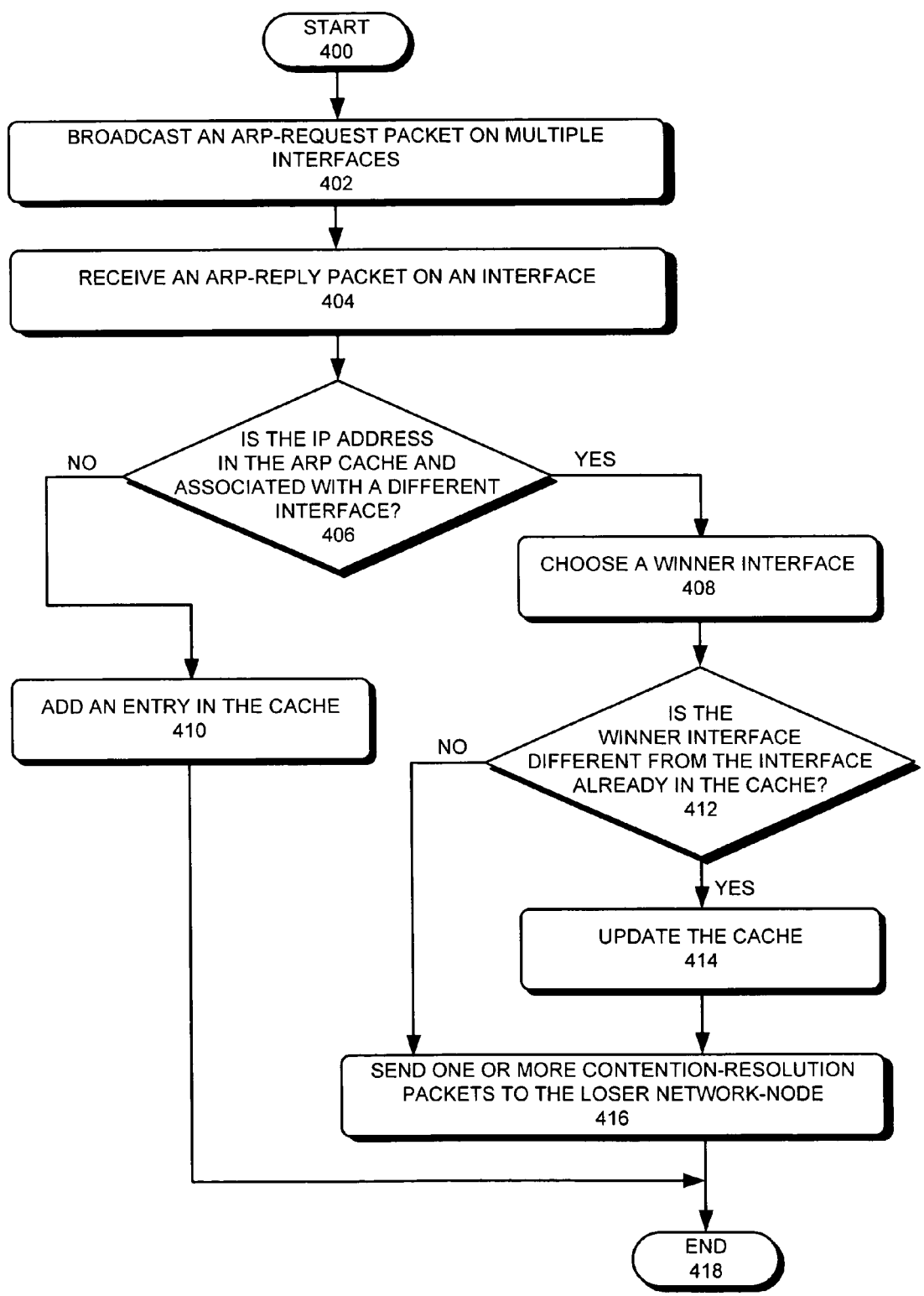
FIG. 4 presents a flow chart illustrating the process of providing link-local IPv4 addressing across multiple interfaces of a computer, in accordance with an embodiment of the present invention.

FIG. 4 presents a flow chart illustrating the process of providing link-local IPv4 addressing across multiple interfaces 104, 106, 108, and 110 of a network node, such as a computer 102, in accordance with an embodiment of the present invention. First, the computer 102 broadcasts an ARP-request packet on the multiple interfaces (step 402), such as Ethernet interface 104 and AirPort interface 106, which asks for the hardware address of a target network-node whose link-local IPv4 address is Y. Note that, since the computer 102 broadcasts the ARP-request on multiple interfaces, the user is no longer constrained to use link-local addressing on only one of the interfaces.

Next, the computer 102 receives an ARP-reply packet (step 404) on Ethernet interface 104 from an Ethernet device 206, whose link-local IPv4 address is Y, and whose hardware address is X. Next, the computer 102 checks whether the IPv4 address Y is already in the ARP cache and associated with a different interface (step 406). If Y is not present in the ARP cache of the computer 102, an entry is added to the ARP cache (step 410), which specifies that IP address Y is at the hardware address X on the Ethernet interface 104.

On the other hand, if Y is already present in the ARP cache of the computer 102, and is associated with a different interface, such as AirPort interface 106, the computer 102 resolves the contention by choosing a winner interface (step 408) out of the two interfaces, Ethernet interface 104 and AirPort interface 106.

Assuming that the Ethernet interface 104 is chosen as the winner, the computer 102 then checks whether the winner interface, Ethernet interface 104, is different from the interface that is already in the ARP cache (step 412). If the winner interface, Ethernet interface 104, is different from the interface that is already in the cache, AirPort interface 106, then the computer updates the ARP cache (step 414) to specify that IP address Y is at the hardware address X on the winner interface, Ethernet interface 104.

Finally, the computer 102 sends one or more contention-resolution packets to the loser network-node (step 416), AirPort device 208, which causes the loser network-node, AirPort device 208, to choose another link-local IPv4 address for itself, thereby preventing address ambiguity. Note that the contention-resolution packet can be an ARP-reply packet 300, wherein the sender protocol-address 322 is equal to Y, and the sender hardware-address 320 is equal to X.

Hence, by broadcasting the ARP-request packet on multiple interfaces, Ethernet interface 104 and AirPort interface 106, and by sending one or more contention-resolution packets on the loser interface, AirPort interface 106, the above-described embodiment of the present invention avoids address ambiguity. In this way, the above described embodiment can provide link-local IPv4 addressing across multiple interfaces. This allows the network nodes to automatically configure IPv4 addresses for their interfaces, thereby simplifying network-node configuration.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing link-local addressing across multiple interfaces of a source network-node, comprising:
broadcasting an address-resolution request packet on interfaces $Z_1$ and $Z_2$ of the source network-node, wherein the source network-node currently associates the link-local protocol-layer address Y with interface $Z_1$, and wherein the address-resolution request packet requests an hardware address which is associated with link-local protocol-layer address Y;
receiving an address-resolution reply packet at the source network-node on interface $Z_2$, thereby causing a contention between interfaces $Z_1$ and $Z_2$;
determining a winner between interfaces $Z_1$ and $Z_2$; and
in response to determining that $Z_2$ is the winner, associating link-local protocol-layer address Y with interface $Z_2$, and sending a contention-resolution packet on interface $Z_1$, thereby causing a target network-node whose link-local protocol-layer address is Y to choose a link-local protocol-layer address which is different from Y.

2. The method of claim 1, wherein the interface is one of:
an Ethernet interface;
a USB interface;
a Firewire interface; or
an AirPort interface.

3. The method of claim 1, wherein the link-local protocol-layer address is an IPv4 link-local address within the 169.254/16 prefix.

4. The method of claim 1, wherein the contention-resolution packets is an ARP packets.

5. The method of claim 1, wherein sending the contention-resolution packets involves broadcasting the contention-resolution packets on interface $Z_1$.

6. A method for providing link-local addressing across multiple interfaces of a source network-node, comprising:
broadcasting a request packet on multiple interfaces of the source network-node, wherein the request packet asks for the hardware address of a network node whose link-local protocol-layer address is Y;
receiving a reply packet at the source network-node on interface $Z_1$ from a target network-node whose link-local protocol-layer address is Y and whose hardware address is X;
if Y is not present in the address cache of the source network-node, adding an entry in the address cache which specifies that protocol-layer address Y is at the hardware address X on interface $Z_1$;
otherwise, if Y is already present in the address cache of the source network-node and is associated with a different interface $Z_2$, resolving the contention by
choosing a winner interface out of $Z_1$ and $Z_2$,
if interface $Z_1$ is chosen as the winner, updating the address cache so that it specifies that protocol-layer address Y is at the hardware address X on interface $Z_1$, and
sending one or more contention-resolution packets on the loser interface to cause the loser network-node to choose another link-local protocol-layer address for itself.

7. A computer-readable storage medium storing instructions that when executed by a computer cause the computer to perform a method for providing link-local addressing across multiple interfaces of a source network-node, comprising:
broadcasting an address-resolution request packet on interfaces $Z_1$ and $Z_2$ of the source network-node, wherein the source network-node currently associated the link-local protocol-layer address Y with interface $Z_1$, and wherein the address-resolution request packet requests an hardware address which is associated with link-local protocol-layer address Y;
receiving an address-resolution reply packet at the source network-node on interface $Z_2$, thereby causing a contention between interfaces $Z_1$ and $Z_2$; from a target network-node;
determining a winner between interfaces $Z_1$ and $Z_2$; and
in response to determining that $Z_2$ is the winner, associated link-local protocol-layer address Y with interface $Z_2$, and sending a contention-resolution packet on interface $Z_1$, thereby causing a target network-node whose link-local protocol-layer address is Y to choose a link-local protocol-layer address which is different from Y.

8. The computer-readable storage medium of claim 7, wherein the interface is one of:
an Ethernet interface;
a USB interface;
a Firewire interface; or
an AirPort interface.

9. The computer-readable storage medium of claim 7, wherein the link-local protocol-layer address is an IPv4 link-local address within the 169.254/16 prefix.

10. The computer-readable storage medium of claim 7, wherein the contention-resolution packets is an ARP packets.

11. The computer-readable storage medium of claim 7, wherein sending the contention-resolution packet involves broadcasting the contention-resolution packets on interface $Z_1$.

12. A computer-readable storage medium storing instructions that when executed by a computer cause the computer to perform a method for providing link-local addressing across multiple interfaces of a source network-node, comprising:
broadcasting a request packet on multiple interfaces of the source network-node, wherein the request packet asks for the hardware address of a network node whose link-local protocol-layer address is Y;
receiving a reply packet at the source network-node on interface $Z_1$ from a target network-node whose link-local protocol-layer address is Y and whose hardware address is X;
if Y is not present in the address cache of the source network-node, adding an entry in the address cache which specifies that protocol-layer address Y is at the hardware address X on interface $Z_1$;
otherwise, if Y is already present in the address cache of the source network-node and is associated with a different interface $Z_2$, resolving the contention by
choosing a winner interface out of $Z_1$ and $Z_2$, if interface $Z_1$ is chosen as the winner, updating the address cache so that it specifies that protocol-layer address Y is at the hardware address X on interface $Z_1$, and sending one or more contention-resolution packets on the loser interface to cause the loser network-node to choose another link-local protocol-layer address for itself.

13. An apparatus for providing link-local addressing across multiple interfaces of a source network-node, the apparatus comprising:

a broadcasting mechanism configured to broadcast an address-resolution request packet on interfaces $Z_1$ and $Z_2$ of the source network-node, wherein the source network-node currently associates the link-local protocol-layer address Y with interface $Z_1$, and wherein the address-resolution request packet requests an hardware address which is associated with link-local protocol-layer address Y;

a receiving mechanism configured to receive an address-resolution reply packet at the source network-node on interface $Z_2$, thereby causing a contention between interfaces $Z_1$ and $Z_2$; and a determining mechanism configured to determine a winner between interfaces $Z_1$ and $Z_2$; and a resolving mechanism configured to, in response to determining that $Z_2$ is the winner, associate link-local protocol-layer address Y with interface $Z_2$, and send a contention-resolution packet on interface $Z_1$, thereby causing a target network-node whose link-local protocol-layer address is Y to choose a link-local protocol-layer address which is different from Y.

14. The apparatus of claim 13, wherein the interface is one of:

an Ethernet interface;
a USB interface;
a Firewire interface; or
an AirPort interface.

15. The apparatus of claim 13, wherein the link-local protocol-layer address is an Ipv4 link-local address within the 169.254/16 prefix.

16. The apparatus of claim 13, wherein the contention-resolution packets is an ARP packets.

17. The apparatus of claim 13, wherein the contention-resolution mechanism is further configured to broadcast the contention-resolution packets on interface $Z_1$.

18. An apparatus for providing link-local Ipv4 addressing across multiple interfaces of a source network-node, the apparatus comprising:

a broadcasting mechanism configured to broadcast an Address Resolution Protocol (ARP) request packet on multiple interfaces of the source network-node, wherein the ARP-request packet asks for the hardware address of a network node whose link-local Ipv4 address is Y;

a receiving mechanism configured to receive an ARP-reply packet at the source network-node on interface $Z_1$ from a target network-node whose link-local Ipv4 address is Y and whose hardware address is X;

an adding mechanism, wherein if Y is not present in an ARP cache of the source network-node, the adding mechanism is configured to add an entry in the ARP cache which specifies that IP address Y is at the hardware address X on interface $Z_1$;

a determination mechanism configured to determine if Y is already present in the ARP cache of the source network-node and is associated with a different interface $Z_2$; and a contention-resolution mechanism, wherein if Y is already present in the ARP cache of the source network-node and is associated with a different interface $Z_2$, then contention resolution mechanism is configured to resolve the contention between interfaces $Z_1$ and $Z_2$.

19. The apparatus of claim 18, wherein when resolving the contention the contention-resolution mechanism is configured to:

choose a winner interface out of $Z_1$ and $Z_2$, if interface $Z_1$ is chosen as the winner, to update the ARP cache so that it specifies that IP address Y is at the hardware address X on interface $Z_1$, and to send one or more contention-resolution packets on the loser interface to cause the network-node on a losing interface to choose another link-local Ipv4 address for itself.

* * * * *

UNITED STATES PATENT AND TRADEMARK OFFICE
CERTIFICATE OF CORRECTION

PATENT NO. : 7,457,255 B2
APPLICATION NO. : 10/877533
DATED : November 25, 2008
INVENTOR(S) : Stuart D. Cheshire It is certified that error appears in the above-identified patent and that said Letters Patent is hereby corrected as shown below:

In claim 4 (at column 5, line 46), please replace the word "packets" with the word --packet-- so that the line reads: packet is an ARP packet.

In claim 5 (at column 5, line 48), please replace the word "packets" with the word --packet--.

In claim 5 (at column 5, line 49), please replace the word "packets" with the word --packet--.

In claim 7 (at column 6, line 15), please replace the word "associated" with the word --associates--.

In claim 10 (at column 6, line 44), please replace the word "packets" with the word --packet--.

In claim 18 (at column 8, line 18), please replace the word "an" with the word --the--.

Signed and Sealed this

Twenty-fourth Day of February, 2009

JOHN DOLL
*Acting Director of the United States Patent and Trademark Office*